E. O. SUTTON.
TRACTOR TRAILER ATTACHMENT.
APPLICATION FILED MAR. 12, 1917.
1,263,622.
Patented Apr. 23, 1918.
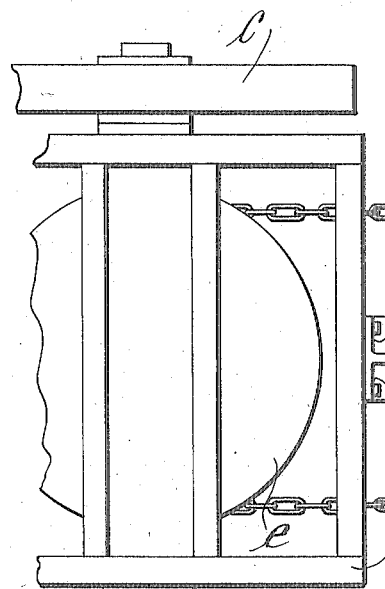
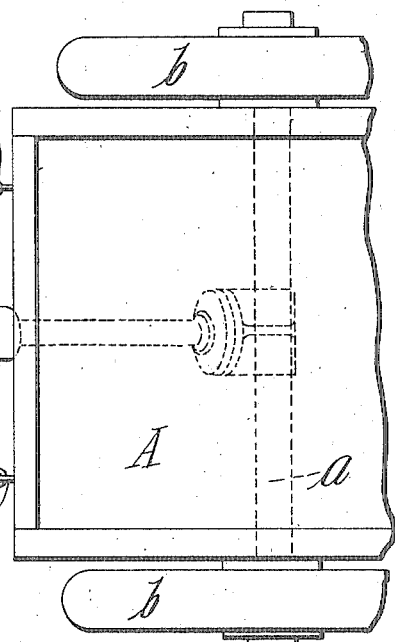
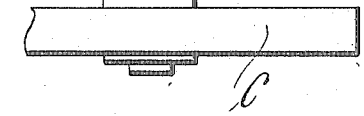
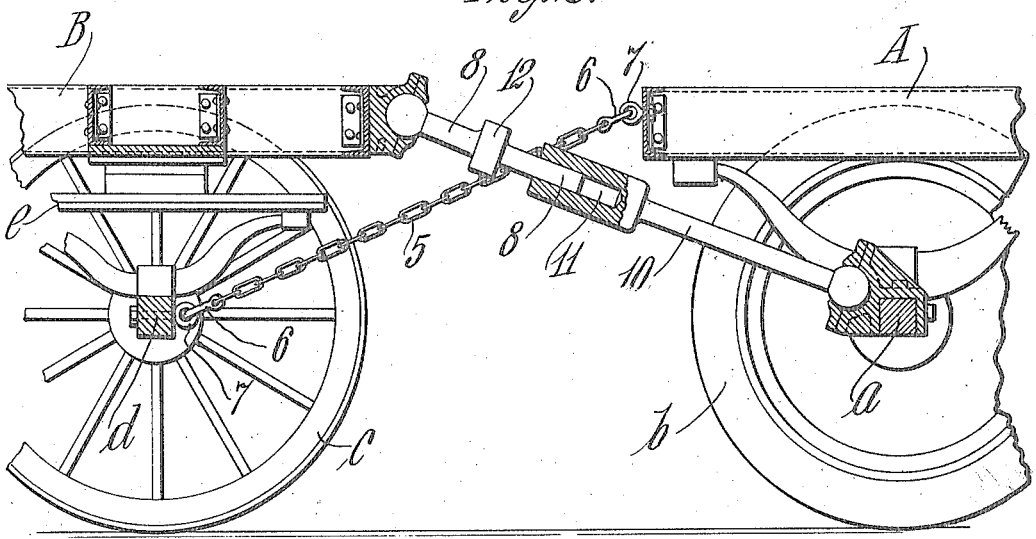
WITNESS
W. C. Ross.
INVENTOR.
Edward O. Sutton.
BY
Chapin & Neal.
ATTORNEYS.

UNITED STATES PATENT OFFICE.

EDWARD O. SUTTON, OF SPRINGFIELD, MASSACHUSETTS.

TRACTOR-TRAILER ATTACHMENT.

1,263,622.  Specification of Letters Patent.  Patented Apr. 23, 1918.

Application filed March 12, 1917. Serial No. 154,275.

*To all whom it may concern:*

Be it known that I, EDWARD O. SUTTON, a citizen of the United States of America, residing at Springfield, in the county of Hampden and State of Massachusetts, have invented certain new and useful Improvements in Tractor-Trailer Attachments, of which the following is a specification.

This invention relates generally to draft and traction apparatus and more particularly to an improved draft and traction apparatus which may be used to advantage in the now well known tractor-trailer combination of vehicles for highway use.

It is generally desirable in such a combination of vehicles to have the draft connection connected to the tractor at a point higher than that at which it is connected to the trailer, for, by so doing, improved traction on the driving wheels of the tractor is obtained. The draft connection heretofore used, however, has usually been a rigid one and, when the coupled vehicles are traveling on a down grade or during any retardation period of the tractor, as in quick braking action, the trailer pushes on the tractor by means of the rigid draft connection. The result of such an arrangement is that the push exerted by the trailer on the tractor tends to lift the rear wheels of the latter, when the so-called "high pull" connection is used, and thereby the pressure on the rear wheels is diminished. The danger of thus reducing the pressure on the rear wheels may lead to serious difficulty by decreasing the braking effect exerted by the tractor when the latter is extremely desirable as on going down steep grades.

The main object of this invention is to provide in a tractor-trailer combination of vehicles, a connecting means therebetween which is operable to exert a downward thrust on the driving wheels of the tractor when the trailer is pushing on the latter, the means being characterized by augmenting the pressure on the tractor driving wheels at time when most needed to insure effective braking operations of the tractor.

Another object of this invention is to provide an improved arrangement of draft and traction apparatus whereby the driving and trailing vehicles may be so coupled together as to augment at all times the pressure on the driving wheels of the driving vehicle or tractor beyond that due to the weight of the latter when the vehicles are moving.

Another object of this invention is to provide a flexible draft connection between a point on the driving vehicle and a lower point on the trailing vehicle, and a rigid connection between a point on the trailing vehicle and a lower point on the driving vehicle, said last named connection arranged to come into play when the tension in the flexible connection is relaxed.

Other objects and advantages will appear in the following description and in the appended claims.

In the accompanying drawings, wherein a single embodiment of the invention is shown for illustrative purposes—

Figure 1 is a plan view showing the draft apparatus as applied to connect the rear end of a tractor to the forward end of a trailer; and Fig. 2 is a sectional elevation of Fig. 1.

Referring to these drawings in detail, A represents the frame of a tractor or other driving vehicle and B the frame of the trailing vehicle. Frame A is shown as supported from a rear axle *a*, and on the latter are suitable driving wheels *b*. The latter may be driven in any suitable manner, and the driving means has been omitted from the drawing as unnecessary to an understanding of the invention. The forward wheels *c* of trailer B are mounted on an axle *d* which supports the trailer frame through the intermediary of a suitable fifth wheel device *e*. Axle *d* is thus the steering means for the trailer and may be connected to the tractor in any suitable manner for steering purposes. Since the steering means forms no part of the present invention, it has been omitted from the illustration and description as unnecessary to an understanding of the invention. It is recognized that a means for manipulating the axle *d* for steering purposes must be provided in practice, and the draft apparatus has been illustrated in such a manner as to permit steering so that any of the known steering connections may be provided as desired. The tractor and trailer have been illustrated only in a conventional way merely for the purpose of illustrating the application of the invention thereto. It is to be understood that the tractor and trailer may be of any type desired as the invention is in the main independent of the particular structure of the connected vehicles.

The draft connection between the tractor and trailer is preferably flexible and may be a chain 5, as illustrated, or a cable or any other non-rigid connecting means. Preferably two chains 5 are used, one on each side of the center line of the coupled vehicles as shown in Fig. 1. As shown in the drawings, chains 5 may be detachably secured to the rear of frame A and to the axle $d$ by hooks 6 and eye bolts 7. It is preferred to have the points at which chains 5 are secured to tractor A located in a plane above the points at which the chains are secured to axles $d$ for a reason to appear. A connection between the tractor and trailer is provided which comprises a rod 8 connected to the forward end of the trailer by a ball and socket joint and a rod 10 similarly connected to axle $a$ of the tractor. The rod 8 is slidable in a hole 11 formed in the enlarged end of rod 10, as shown in Fig. 2, and has a flange 12 thereon which is adapted, as will appear, to abut the end of rod 10.

In normal operation, the tractor A draws the trailer by means of chains 5 and, when the latter are taut, flange 12 is separated as shown in Fig. 2 from the enlarged end of rod 10. The rods 8 and 10 are always held in alinement by the engagement of the former in socket 11, and form an extensible and contractible connection between the vehicles. The ball and socket connection of rods 8 and 10 with the trailer and tractor, respectively, permits steering of the latter by allowing for swinging movement of the rods 8 and 10 as the vehicles are turned, the one relatively to the other. The ball and socket connections furthermore allow relative variations in heights of the connected units A and B so that the one can rise and fall freely relatively to the other when traveling over rough roads, on grades and the like.

In normal operation, when tractor A is pulling trailer B by means of chains 5 arranged as shown in Fig. 2, an increased pressure is obtained on the tractor driving wheels $b$ over and above that due to the weight of the tractor. The force is applied to the trailer at an angle and the line of applied force inclines upwardly toward the tractor. This force may be resolved into two components, one acting in a horizontal direction to draw the trailer and the other acting in a vertical direction to force the driving wheels $b$ downward. Thus, by connecting the tractor and trailer in this manner, increased traction is obtained on the tractor driving wheels. Although the arrangement of chains described is preferred on account of increased traction, it is, however, not essential, and the invention is independent of the particular arrangement of chains.

The invention is more particularly concerned with means to exert a downward pressure on the tractor driving wheels at such times as the trailer is pushing on the tractor in order to insure effective braking operations of the latter. For example, when the vehicles are traveling on a down grade or during any period of retardation of the tractor, the trailer normally exerts a push on the tractor. This push is made use of to secure increased pressure on the tractor driving wheels. Thus, the connection 5 being flexible as described slackens when the tractor is retarded, and the two vehicles move together until the flange 12 abuts the enlarged end of rod 10. Thereafter, the pushing effect of the trailer on the tractor is exerted in a direction inclined downwardly toward the tractor axle $a$. This force may be resolved into horizontal and vertical components as before, and it will be obvious that the vertical component acts downwardly on axle $a$ to increase the pressure on the wheels $b$. Thus, the pressure on the driving wheels of the tractor is increased at times when most needed to insure an effective braking effort by the tractor so that the coupled vehicles may travel safely down steep grades.

Thus, an improved draft and traction apparatus has been provided which is characterized by producing a downward pressure on the driving wheels of the tractor at all times when the trailer is pushing on the latter together with means to increase the traction on the driving wheels when the tractor is pulling the trailer. The invention has been described herein in one form for the purpose of illustration, but the scope of the invention is defined by the appended claims rather than by the foregoing description.

What I claim is—

1. The combination with a driving and a trailing vehicle, of a draft connection between said vehicles and another connection between the vehicles automatically operable at all times when the trailing vehicle is pushing the driving vehicle to exert a downward pressure on the driving wheels of the latter.

2. The combination with a driving and a trailing vehicle, of a draft connection between said vehicles, and another connection between a point on the trailing vehicle and a lower point on the driving vehicle automatically operable at all times when the trailing vehicle is pushing the driving vehicle to exert a downward pressure on the driving wheels of the latter.

3. The combination with a driving and a trailing vehicle of connecting means between said vehicles operable when the driving vehicle is pulling the trailing vehicle to exert a downward pressure on the driving wheels of the driving vehicle, and a device connecting said vehicles operable when the trailing vehicle is pushing the driving vehicle to exert a downward pressure on the driving wheels thereof.

4. The combination with a driving and a trailing vehicle, of a flexible draft connection therebetween operable when the driving vehicle is pulling the trailing vehicle to exert a downward pressure on the driving wheels of the former, and a connecting means between the vehicles arranged to come into play when the draft connection slackens to exert a downward pressure on the driving wheels of the driving vehicle.

5. The combination with a tractor and trailer of a draft connection between a point on the tractor and a lower point on the trailer, whereby when the tractor pulls the trailer a downward pressure is exerted on the driving wheels of the tractor, and connecting means between a point on the trailer and a lower point on the tractor operable to exert a downward pressure on the driving wheels of the tractor during retardation of the latter.

6. The combination with a tractor and trailer of a flexible draft connection between a point on the tractor and a lower point on the trailer, and means connecting a point on the latter to a lower point on the tractor, said means comprising relatively movable parts which, when the tractor is retarded, are arranged to coöperate and form a rigid connection to transmit a downward thrust from the trailer to the tractor.

7. The combination with a tractor and trailer of a flexible draft connection between a point on the tractor and a lower point on the trailer, and means connecting a point on the latter to a lower point on the tractor, said means comprising interengaging parts constructed and arranged for relative extension to permit the trailer to be pulled through said draft connection and for abutment when the tractor is retarded to permit a downward thrust of the trailer to be transmitted to the tractor.

EDWARD O. SUTTON.